United States Patent
Nam et al.

(10) Patent No.: US 11,100,491 B2
(45) Date of Patent: Aug. 24, 2021

(54) ELECTRONIC CARD AND METHOD OF OPERATING ELECTRONIC CARD

(71) Applicant: KONA I CO., LTD., Seoul (KR)

(72) Inventors: Jung Bong Nam, Seoul (KR); Seung Gi Lee, Incheon (KR); Jung Haeng Jo, Seoul (KR)

(73) Assignee: KONA I CO., LTD., Seoul (KR)

( * ) Notice: Subject to any disclaimer, the term of this patent is extended or adjusted under 35 U.S.C. 154(b) by 0 days.

(21) Appl. No.: 16/631,369

(22) PCT Filed: Jul. 19, 2018

(86) PCT No.: PCT/KR2018/008164
§ 371 (c)(1),
(2) Date: Jan. 15, 2020

(87) PCT Pub. No.: WO2019/017705
PCT Pub. Date: Jan. 24, 2019

(65) Prior Publication Data
US 2020/0219084 A1    Jul. 9, 2020

(30) Foreign Application Priority Data

Jul. 19, 2017  (KR) .................. 10-2017-0091524

(51) Int. Cl.
*G06K 5/00*      (2006.01)
*G06Q 20/34*     (2012.01)
(Continued)

(52) U.S. Cl.
CPC ....... *G06Q 20/341* (2013.01); *G06K 19/0705* (2013.01); *G06K 19/07703* (2013.01); *G06Q 20/3563* (2013.01); *G06Q 20/3574* (2013.01)

(58) Field of Classification Search
CPC ............. G06Q 20/341; G06K 19/0705; G06K 19/07703
(Continued)

(56) References Cited

U.S. PATENT DOCUMENTS 9,053,398 B1 * 6/2015 Cloutier ................. G06K 7/082
9,984,320 B2 * 5/2018 Bae ..................... G06K 19/0725
(Continued)

FOREIGN PATENT DOCUMENTS

KR   10-2011-0062620 A   6/2011
KR   10-2016-0008444 A   1/2016
(Continued)

*Primary Examiner* — Ahshik Kim
(74) *Attorney, Agent, or Firm* — Novick, Kim & Lee, PLLC; Sang Ho Lee; Hyun Woo Shin

(57) ABSTRACT

An electronic card includes: a plate type card plate; a secure element embedded in the plate type card plate and for storing a plurality of application programs linked with a payment means; a control unit for identifying one of the plurality of application programs on the basis of a selection signal received through a selection unit formed on the card plate to generate information for activating the payment means; and a display unit for displaying information for identifying the payment means on the basis of the information for activating the payment means. The control unit manages the identified application program on the basis of the selection signal as a selected application program to generate the information for activating the payment means, by mapping the selection signal on the basis of information about the plurality of application programs provided from the secure element and storing the same, and the secure element receives the information for activating the payment means from the control unit and activates the selected application program when a payment attempt is made from the outside.

14 Claims, 8 Drawing Sheets

(51) Int. Cl.
*G06K 19/07* (2006.01)
*G06K 19/077* (2006.01)

(58) Field of Classification Search
USPC .......................................... 235/380
See application file for complete search history.

(56) References Cited

U.S. PATENT DOCUMENTS

| | | | | |
|---|---|---|---|---|
| 2006/0196929 | A1* | 9/2006 | Kelley | G06Q 20/3574 |
| | | | | 235/380 |
| 2010/0127083 | A1* | 5/2010 | Brown | G07F 7/08 |
| | | | | 235/492 |
| 2013/0228616 | A1* | 9/2013 | Bhosle | G06Q 20/354 |
| | | | | 235/375 |
| 2014/0263626 | A1 | 9/2014 | Pochic | |
| 2015/0170014 | A1* | 6/2015 | Olson | G06Q 20/354 |
| | | | | 235/380 |
| 2016/0132761 | A1* | 5/2016 | Hanmer | G06K 19/0716 |
| | | | | 235/492 |
| 2016/0148194 | A1* | 5/2016 | Guillaud | G07F 7/0846 |
| | | | | 705/44 |

FOREIGN PATENT DOCUMENTS

| | | |
|---|---|---|
| KR | 10-2016-0008945 A | 1/2016 |
| KR | 10-2016-0090633 A | 8/2016 |

\* cited by examiner

ELECTRONIC CARD AND METHOD OF OPERATING ELECTRONIC CARD

FIELD OF THE DISCLOSURE

The present disclosure relates to an electronic card and an operating method of the electronic card, which can selectively activate an application program linked to a payment means stored in a secure element of a physical electronic card.

BACKGROUND OF THE DISCLOSURE

As payment methods are diversified, payment methods using an application in a smart device, such as a mobile electronic device, are provided recently. However, the payment methods using an application driven on a smart device are basically based on a physical plastic card, such as a credit card or a check card, and payment is made by linking information acquired from the smart device to information on the credit card or the check card.

Credit cards or check cards manufactured recently tend to be manufactured as an electronic card including an integrated circuit chip therein. The electronic cards like this are also called as smart cards. An electronic card has its own computing function therein and can be utilized in various ways. Particularly, the electronic cards have the advantage of excellent security and large storage capacity.

SUMMARY OF THE DISCLOSURE

The present disclosure provides an electronic card and an operating method of the electronic card, which can selectively activate an application program linked to a payment means in a secure element installed inside the card by utilizing a plurality of card selection buttons provided in a card of a plate shape.

The present disclosure provides an electronic card and an operating method of the electronic card, which can set a payment means using a plurality of card selection buttons through a battery provided in a card of a plate shape, and manage internally set payment means information.

The present disclosure provides an electronic card and an operating method of the electronic card, in which as information for identifying a payment means selected through a plurality of card selection buttons is displayed through a display, a value selected by the plurality of card selection buttons can be diversely changed as needed without having a fixed value.

To accomplish the above objects, according to one aspect of the present disclosure, there is provided an electronic card comprising: a card plate of a plate shape; a secure element embedded in the card plate of a plate shape to store a plurality of application programs linked to a payment means; a control unit for identifying one of the plurality of application programs on the basis of a selection signal received through a selection unit formed on the card plate, and generating payment means activation information; and a display unit for displaying information for identifying the payment means on the basis of the payment means activation information. As the payment means is stored to be mapped to the selection signal on the basis of information on the plurality of application programs provided by the secure element, the control unit manages the application program identified on the basis of the selection signal as a selected application program and generates the payment means activation information. When a payment attempt is made from the outside, the secure element receives the payment means activation information from the control unit and activates the selected application program.

In an embodiment, the electronic card may further comprise a power supply formed on the card plate and activated regardless of a card payment to supply power to the control unit and the selection unit and drive transmission and reception of the selection signal.

In an embodiment, information on the plurality of application programs provided from the secure element to the control unit may include at least one among an index of each application program, information displayed on the display unit to identify each application program, and description of a payment means linked to each application program.

In an embodiment, the secure element may request the payment means activation information from the control unit in response to a payment request received from the outside.

In an embodiment, as information on the plurality of application programs is changed, the secure element may transfer the changed application program information to the control unit.

In an embodiment, as supply of power from the power supply begins, the control unit may display information for identifying the payment means set on the basis of the payment means activation information on the display unit.

In an embodiment, the control unit may display information for identifying a payment means linked to the plurality of application programs on the display unit in response to the selection signal received from the selection unit.

In an embodiment, the selection unit may include at least one among up, down, left and right selection elements for sequentially selecting the plurality of application programs.

In an embodiment, when an input of the selection unit is not received within a preset time staring from a time point of starting supply of power from the power supply, the control unit may enter a sleep mode.

According to various embodiments of the present disclosure, the electronic card may further comprise an activation control unit formed on the card plate to control activation of supply of power.

In an embodiment, when an input of the activation control unit is received within the preset time staring from the time point of starting supply of power, the control unit may enter the sleep mode.

In an embodiment, the control unit may map the index information among the application program information and the selection signal.

An operating method of an electronic card according to an embodiment of the present disclosure may be performed using the electronic card including a secure element installed in a card plate of a plate shape. The method may comprise the steps of: transmitting information on a plurality of installed application programs to a control unit, by the secure element; requesting information on an application program selected among the plurality of application programs from the control unit in response to a payment request received from the outside, by the secure element; and activating a corresponding application program on the basis of information on the selected application program, by the secure element.

In an embodiment, the operating method of an electronic card according to various embodiments of the present disclosure may further comprise the step of mapping and managing information on the plurality of application programs received from the secure element and a selection signal received through a selection unit formed on the card plate, by the control unit.

In an embodiment, the operating method of an electronic card according to various embodiments of the present disclosure may further comprise the step of identifying a selected application program from the plurality of application programs on the basis of the selection signal, and generating payment means activation information, by the control unit.

In an embodiment, the operating method of an electronic card may further comprise the steps of: receiving a response according to transmission of information on the plurality of application programs from the control unit, by the secure element; and retransmitting information on the plurality of application programs on the basis of application program version information included in the response received from the control unit, by the secure element.

In an embodiment, the operating method of an electronic card may further comprise the steps of: supplying power to the control unit and the selection unit from a power supply formed on the card plate of a plate shape in response to an input of an activation control unit; starting count of a preset time in response to the input of the activation control unit formed on the card plate of a plate shape, by the control unit; and entering a sleep mode when an input of the selection unit is not received within the preset time or an input of the activation control unit is received, by the control unit.

In an embodiment, the operating method of an electronic card according to various embodiments of the present disclosure may further comprise the step of initializing count of the preset time when an input of the selection unit is received within the preset time, by the control unit.

In an embodiment, the operating method of an electronic card according to various embodiments of the present disclosure may further comprise the step of displaying information for identifying a payment means linked to the selected application program through a display unit formed on the card plate, by the control unit.

The present disclosure includes a program stored in a medium to execute a method according to an embodiment of the present disclosure in a computer.

The present disclosure includes a computer-readable recording medium recording a program for executing a method according to an embodiment of the present disclosure in a computer.

An electronic card and an operating method of the electronic card according to the present disclosure have an effect of possessing a plurality of cards, from the viewpoint of a user of the electronic card, by selecting a payment means through a selection unit formed in a physical card of a plat shape. That is, the user of the electronic card may select a main payment means from a plurality of payment means in the electronic card, and accordingly, the user of the electronic card may be relieved of the inconvenience of carrying a plurality of cards.

Furthermore, an electronic card and an operating method of the electronic card according to the present disclosure may select a payment means through a selection unit formed in a physical card of a plat shape and may change the selected payment means according to a selection method of the selection unit.

An electronic card and an operating method of the electronic card according to the present disclosure may flexibly change a payment means linked to a selection unit formed in the electronic card. The electronic card and the operating method of the electronic card according to the present disclosure may improve security by preventing exposure of information which requires security in the process of selecting a plurality of payment means.

An electronic card and an operating method of the electronic card according to the present disclosure may set a payment means through a battery provided in the card, and may be supplied with power from the outside of the card. Therefore, power can be flexibly consumed as needed.

DETAILED DESCRIPTION

Figure 1:
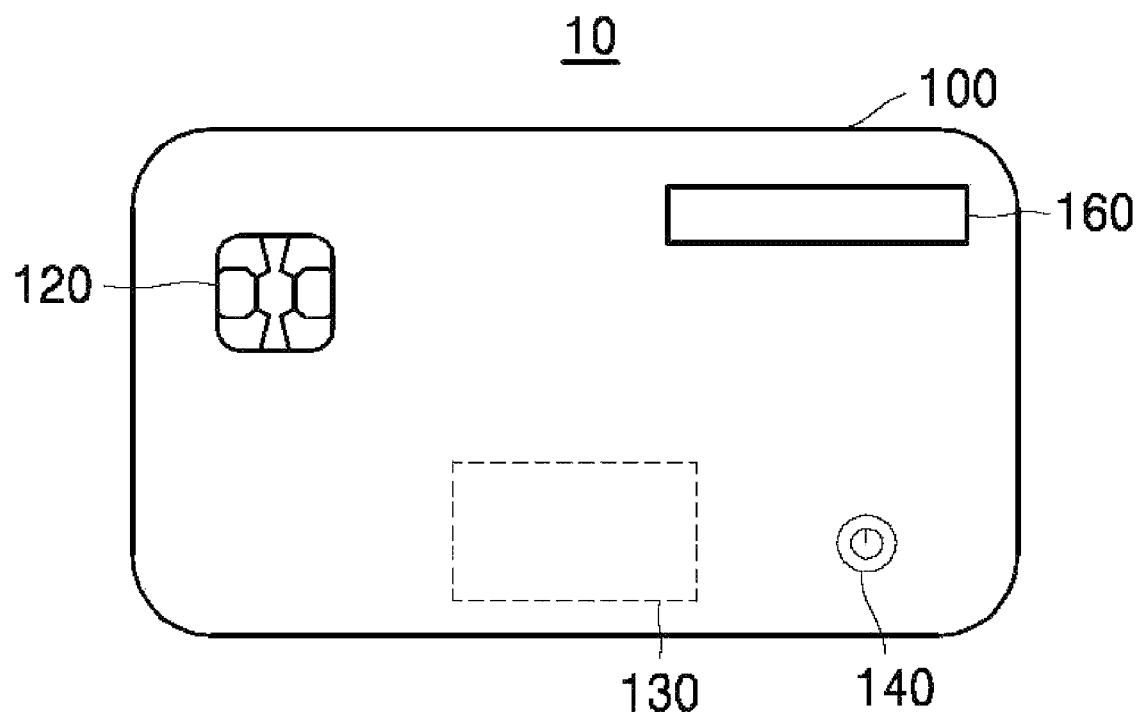
FIG. 1 is a view showing the appearance of an electronic card according to an embodiment of the present disclosure.

Hereinafter, preferred embodiments of the present disclosure will be described in detail with reference to the accompanying drawings to clarify the technical spirit of the present disclosure. In describing the present disclosure, detailed description of related known functions or components will be omitted when it is determined that the detailed description of the present disclosure may unnecessarily obscure the subject matters of the present disclosure. The same reference numerals and symbols are given to the components having substantially the same functional configuration in the drawings as much as possible although they are shown in different drawings. For convenience of explanation, the device and method should be described together if needed.

Figure 2:
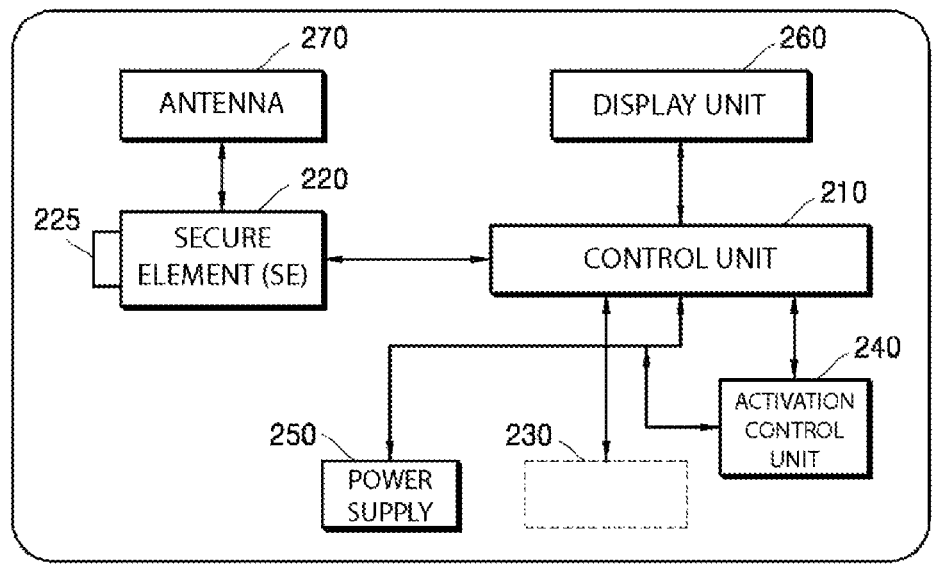
FIGS. 2 and 3 are block diagrams showing the internal configuration of an electronic card according to embodiments of the present disclosure.

FIG. 1 is a view showing the appearance of an electronic card according to an embodiment of the present disclosure, and FIG. 2 is block diagram showing the internal configuration of an electronic card according to an embodiment of the present disclosure.

Referring to FIG. 1, seeing an electronic card 10 according to an embodiment of the present disclosure from the outside, an IC chip 120, a selection unit 130, an activation control unit 140, and a display 160 are observed.

First, the operation of the electronic card 10 observed from the outside will be described, and specific internal components of the electronic card performing this operation will be described with reference to the electronic cards 20 and 20' of FIGS. 2 and 3.

The electronic card 10 according to an embodiment of the present disclosure may be a physical card of a plate shape. For example, the electronic card 10 may have a physical form of a plate shape, such as a plastic material or a metal material, and may include an IC chip 120 to store information on a plurality of payment means. Accordingly, information needed for the payment means issued by various card companies may be stored in the IC chip 120. In the present disclosure, the IC chip 120 may communicate with an external terminal in a contact or contactless manner. Specifically, the IC chip 120 may communicate with or give and receive power to and from a card reader in a contact manner, and may operate in a contactless manner on the basis of the power generated through a wireless signal. Although it will be described below with reference to FIGS. 2 and 3, in the present disclosure, the IC chip 120 may be an implementation example of a secure element 220.

The electronic card 10 may include a selection unit 130 formed on a card of a plate shape. In the present disclosure, one of the payment means stored in the IC chip 120 (the secure element 220 of FIGS. 2 and 3) may be selected as a main payment card according to selection of the selection unit 130.

According to embodiments, the selection unit 130 may be implemented in various forms. For example, the selection unit 130 includes one or more mechanical or electrical buttons, a touch screen and the like, and may be implemented as a means capable of recognizing whether a selection is made through a user's input from the outside.

Various examples of the selection unit 130 will be described below with reference to FIGS. 4 to 8.

According to embodiments, the selection unit 130 may be implemented to perform a function of selecting a variety of functions, such as an one-time password (OTP) requesting means, a card user registration means, a card deactivation (locking) means, a means for requesting display of unique information of a card, such as an expiry date, a user, and a CVC, and the like, in addition to the function of selecting one of the payment means.

The electronic card 10 according to the present disclosure may include an activation control unit 140 and set a payment means. According to an input received through the activation control unit 140, power is supplied to other components in the electronic card 10 through a power supply provided in the electronic card 10 itself. For example, power may be provided to the components for selecting a payment means, specifically, the control unit 210 and the selection unit 230 shown in FIGS. 2 and 3, from a power supply inside the electronic card 10.

To be similar to the selection unit 130, the activation control unit 140 includes one or more mechanical or electrical buttons, a touch screen and the like, and may be implemented as a means for recognizing ON/OFF of activation through a user's input from the outside.

In addition, the electronic card 10 may include a display unit 160 to display information for identifying a payment means selected through the selection unit 130. For example, if fixed information is not displayed on the selection unit 130, the user may not know which payment means is selected when a selection is made through the selection unit 130. The electronic card 10 according to the present disclosure includes the display unit 160 for feeding back an operation including the selection to the user and may display the information for identifying a payment means selected by the user to confirm the result of the user's selection.

In addition, the display unit 160 may display various information, such as an OTP number, card authentication information (expiry date, CVC number) and the like, as well as state information (setting error, sleep, power ON/OFF, payment response) of the electronic card 10, while displaying which payment means is the set payment means.

The display unit 160 may include a component that can visually display information, including a black and white or color liquid crystal display (LCD), a light emitting display (LED), an electronic paper display (EPD), and the like.

According to embodiments, a payment means selected by the selection unit 130 may be changed as needed. In addition, when the electronic card 10 performs a different function according to a setting process or a payment process, the user may confirm the function selected when a specific input is given to the selection unit 130 through the display unit 160. Therefore, one physical electronic card 10 may be utilized in a variety of ways according to user's or manufacturer's setting, and user's convenience can be enhanced as the user may easily confirm the function of the selection unit 130.

Referring to FIG. 2, the electronic card 20 may include a control unit 210, a secure element 220, a selection unit 230, an activation control unit 240, a power supply 250, and a display unit 260.

The control unit 210 may include a microcontroller unit (MCU) in the form of a printed circuit or a chip interposed between an upper cover sheet and a lower cover sheet forming the electronic card 10 of a plate shape. The control unit 210 may operate by receiving power from the power supply 250 according to input of the activation control unit 240 or may operate through power generated based on a wireless signal provided from the outside.

The control unit 210 includes a storage means and may manage a payment means mapped to a selection signal inputted through the selection unit 230. A payment means selected according to the selection signal inputted through the selection unit 230 may be determined by the secure element 220 or determined through a separate input provided to the control unit 210. In the electronic card 20 according to the present disclosure, a payment means mapped to the selection signal inputted through the selection unit 230 may be determined at the time of manufacturing or may be changed according to the secure element 220 even after the electronic card 20 is manufactured.

The control unit 210 is electrically connected to the selection unit 230 and may receive a selection signal from the selection unit 230 and determine which payment means is selected on the basis of the selection signal.

The control unit 210 may wait for reception of a selection signal from the selection unit 230 for a preset time and enter a sleep mode when there is no input from the selection unit 230 for the preset time. As the control unit 210 enters the sleep mode, exhaustion of the power supply 250 of the electronic card 20 can be prevented.

According to embodiments, the control unit 210 and the selection unit 230 may be connected through a circuit pattern by a printed circuit interposed between the upper cover sheet and the lower cover sheet of the electronic card of a plate shape. When the control unit 210 and the selection unit 230 are connected through a circuit pattern, as a different electrical signal, i.e., a selection signal, is provided to the control unit 210 through the circuit pattern when the selection unit 230 makes a selection, the control unit 210 may identify the selection made by the selection unit 230.

For example, the control unit 210 may operate by a unique synchronization signal. A different synchronization signal generated by the selection of the selection unit 230 may be transferred to the control unit 210 in response to the synchronization signal provided by the control unit 210. In another embodiment, when a plurality of selection elements is included in the selection unit 230, as the selection elements and the control unit 210 are connected through a plurality of circuit lines, the selection elements of the selection unit 230 may be identified through a combination of electrical signals passing through the circuit lines. For example, when the selection unit 230 needs to identify eight selection elements, the selection elements and the control unit 210 may be connected through three circuit lines interposed therebetween. The control unit 210 may identify whether $2^3$ buttons, i.e., selection elements, are selected through a combination of a case of providing an electrical signal to each circuit line and a case of not providing an electric signal. In this case, the control unit 210 includes three input lines and may receive a signal from each of the selection elements.

The control unit 210 may generate payment means activation information on the basis of the selection signal of the selection unit 230. The control unit 210 may directly transfer the payment means activation information to the secure element 220 or may transfer the generated payment means activation information in response to a query received from the secure element 220 thereafter.

According to embodiments, when the selection unit 230 is configured of a plurality of selection elements, the activated control unit 210 may sense a time series combination input of the plurality of selection elements and determine whether a predefined pattern is inputted through the selection unit 203. According to embodiments, predefined patterns and payment means may be managed to match each other, and the control unit 210 may determine a payment means matched to a predefined pattern according to input of the predefined pattern, and set the selected payment means as the main payment means. The control unit 210 may manage the predefined pattern information, and when a predefined pattern is inputted, the control unit 210 may store and manage a payment means linked to the pattern and information on an application program linked to the payment means.

In the present disclosure, the control unit 210 monitors the inputted selection signal of the selection unit 230 in real time, and when it is determined that input of the selection unit 230 within a preset time is input of a predetermined pattern, the control unit 210 immediately generates payment means activation information for a payment means corresponding to the inputted predetermined pattern. In another embodiment, as the user presses a button ("enter", "confirm", "OK", etc.) indicating that the input into the selection unit 230 is completed, the control unit 210 may additionally receive information indicating that the pattern input is completed and generate payment means activation information by comparing a combination of input buttons, inputs of which are completed, with a predefined pattern. For example, when the initial input combinations of the predefined patterns are the same (for example, the first to third inputs of FIGS. 5B and 5C), the control unit 210 receives information indicating that the pattern input is completed, and accuracy of payment means setting can be enhanced.

The control unit 210 may provide the payment means activation information to the display unit 260 to display information for identifying the payment means. When the user cannot confirm which payment means is set by the input through the selection unit 230, the payment means setting can be completed through the display unit 260 by confirming a payment means indicated by a corresponding payment means selection button or indicated by the information selected through the selection unit 230, and re-entering a button corresponding to "setting".

When a payment means is set through the process as described above, the control unit 210 may store information on the set payment means and transfer the set information to the secure element 220.

The secure element 220 according to the present disclosure may include a Universal Integrated Circuit Card (UICC), an embedded SE (eSE), and a micro SD. The secure element 220 may be implemented in the form of the IC chip 120 described with reference to FIG. 1. Since the secure element 220 has its own encryption system and is also separated from the control unit 210, which manages operation of the electronic card 20, it is hacking resistant and highly secure. A plurality of application programs linked to the payment means is stored in the secure element 220.

Since the secure element 220 may store information requiring considerably high security, according to embodiments, the information transmitted between the control unit 210 and the secure element 220 needs to be restrictive when the control unit 210 receives information for selecting a payment means from the selection unit 230, generates payment means activation information, and provides the generated payment means activation information to the secure element 220.

Specifically, the secure element 220 may transfer a list of application programs currently installed in the secure element 220 to the control unit 210, and the control unit 210 may store the application programs installed in the secure element 220 in response thereto, and one of the installed application programs may be selected.

For example, the secure element 220 may store application programs provided by card issuers, such as VISA card application programs, Mastercard application programs, KONA-Money application programs, AMEX card application programs, and the like. The application programs may correspond to Java card applets executed on a Java-based platform. In another embodiment, the secure element 220 may also store application programs provided according to a payment method, such as a cash IC application program, a transportation card application program, and the like.

Table 1 shows an example of the data format of the application program list transmitted from the secure element 220 to the control unit 210. Referring to Table 1, a signal transferred from the secure element 220 to the control unit 210 may include a header, a data, and an error correction element. The header may include information indicating a command related to the current data transmitted from the secure element 220 to the control unit 210, together with information on the data length of the transmitted application program list. For example, the header transferred from the secure element 220 to the control unit 210 may include a value of a transmission command code requesting to transmit the application program list.

Information on the data excluding the header may include at least one among specific contents of the application program list transmitted from the secure element 220 and information on the version of the application program list. According to embodiments, as the secure element 220 transfers specific information on the application programs installed in the secure element 220 to the control unit 210 and information on the version thereof in the initial process, when the version of the application program list is changed, the secure element 220 lets the control unit 210 know the change. If the control unit 210 is able to identify all the application programs only by transferring only the version information, the list of the application programs does not need to be transferred.

TABLE 1

| Name | Description |
| --- | --- |
| Header | Length information and data command code |
| Data | Application program list information and version information of secure element |
| Error correction element | Information for sensing data error |

According to embodiments, since the secure element 220 also inserts an error correction element to transmit the data to the control unit 210, the control unit 210 may sense an error of the received data. For example, the error correction element may be generated and provided in various methods, such as a parity bit, a repetition code, a cyclic redundancy check (CRC), a hash function, and a forward error correction.

The control unit 210 receiving the application program list from the secure element 220 may transmit a response thereto. The response message transferred from the control unit 210 to the secure element 220 may be as shown in Table 2.

TABLE 2

| Name | Description |
| --- | --- |
| Header | Length information and data response code |
| Data | Version information of received application program list and/or dummy |
| Error correction element | Information for sensing data error |

Referring to Table 2, it can be confirmed that the response message of the control unit 210 also has a data format similar to that of the command message received from the secure element 220. The header may include length information of the data that the control unit 210 currently transmits to the secure element 220 in response and a response code indicating that the currently transmitted data corresponds to the response to the command.

The control unit 210 receiving the information on the application program from the secure element 220 may transmit only the version information of the application program list currently managed by the control unit 210 as the application program list is received. According to embodiments, a relatively small amount of data may be inserted in the response message compared to the command message, and an empty space among the space allocated to the data may be filled with a dummy value and used when other information is inserted later.

Finally, an error correction element may be inserted in the response message and transmitted to the secure element 220. According to embodiments, the error correction element may correspond to a value obtained by performing an exclusive OR (XOR) operation on the bytes included in the currently transmitted response message.

As the application program list installed in the secure element 220 is transferred between the secure element 220 and the control unit 210 as described above, the control unit 210 may determine whether the application program installed in the secure element 220 is correct or which application program is selected by the selection signal of the selection unit 230, on the basis of the selection signal received through the selection unit 230.

Power needed in the process of setting a payment means of the electronic card 20 may be provided by the power supply 250 included in the electronic card 20. The power supply 250 may include a primary battery, a rechargeable secondary battery, and an energy harvesting means for generating energy.

Power may be provided from the power supply 250 to the control unit 210 according to input of the activation control unit 240, and the control unit 210 in the sleep state may be activated. According to embodiments, payment means information already set in the control unit 210 before the sleep state may be managed. Accordingly, the control unit 210 activated from the sleep state may inform the user of information on the currently set payment means by providing internal payment means activation information through the display unit 260.

The control unit 210 may include non-volatile memory that can maintain information even when power is cut off.

According to embodiments, the control unit 210 may count a preset time from the time point of starting supply of power in response to the activation control unit 240. The count of the corresponding time may be initialized according to an input from the selection unit 230, and when the preset time is elapsed, the control unit 210 may enter the sleep state again. In addition, if an input signal is transferred again from the activation control unit 240 during the preset time, the control unit 210 may immediately enter the sleep state.

According to embodiments, the preset time may be a unit of several seconds, such as 10 seconds, and the control unit 210 may minimize power consumption of the power supply 250 for input of a card payment means only during the preset time.

When a payment is to be made through an electronic card 20, for which a payment means is set, i.e., card information used as the main card is determined, a signal directing to provide payment information may be provided from an external terminal to the secure element 220.

According to embodiments, the secure element 220 may operate in a contact or contactless manner. When the electronic card 20 operates in a contact manner, the secure element 220 may receive an electrical signal from a card reader via a contact unit 225, and in the same manner, information in the secure element 220 may be provided to the external card reader via the contact unit 225. When the electronic card 20 operates in a contactless manner, the secure element 220 may operate by the power generated through a wireless signal received through the antenna 270, and a signal transferred from the secure element 220 may also be transmitted to the outside through the antenna 270. The antenna 270 may be implemented in a printed conductive pattern installed inside the card of a plate shape.

The control unit 210 may set to execute an application program linked to a specific payment means through the selection unit 230 on the basis of the power supply 250, regardless of whether or not the electronic card 20 is used in the payment process as described above. For example, the control unit 210 may generate and manage payment means activation information.

In this case, when the electronic card 20 is used in the payment process, the control unit 210 may provide the secure element 220 with information indicating that an application program linked to which payment means should be activated, i.e., the payment means activation information.

According to embodiments, the secure element 220 may inquire the control unit 210 which application program should be activated, i.e., based on which application program, the payment operation should be performed, and an application program linked to the payment means activation information received from the control unit 210 may be executed in the secure element 220.

For example, the secure element 220 may request the control unit 210 to provide information on an application program that will be set. At this point, the format of the data provided by the secure element 220 to the control unit 210 may be as shown in Table 3.

TABLE 3

| Name | Description |
| --- | --- |
| Header | Application program information request command code |
| Data | Application program version information of secure element |
| Error correction element | Information for sensing data error |

Referring to Table 3, the length of currently transmitted data and a command code requesting the control unit 210 to provide information on the selected application program, i.e., the payment means activation information, may be included in the header of the command message transmitted from the secure element 220 to the control unit 210.

In addition, the secure element 220 transmits version information of the application program list currently stored in the secure element 220. This is since that information on the set application program may match only when the version of the application program list of the secure element 220 and the version of the application program list of the control unit 210 are equal.

An error correction element may be included in the request message and transmitted to the control unit 210.

The control unit 210 receiving the information on the set application program from the secure element 220 may transmit a response message corresponding thereto, and the data format of the response message may be as shown below in Table 4.

TABLE 4

| Name | Description |
| --- | --- |
| Header | Selected application program transmission response code |
| Data | Version information of application program list of control unit and information on selected application program |
| Error correction element | Information for sensing data error |

Referring to Table 4, the response message may include a header, a data, and an error correction element. The header may include information on the length of the response message and a code indicating that the current response message is a response to the request for information on the application program selected by the secure element 220.

The data portion may include version information of the application program list of the control unit 210 and information on the application program selected through the selection unit 230. The secure element 220 receiving the response message may grasp whether the version of the application program list matches, activate the selected application program, and perform a payment operation.

Finally, the control unit 210 inserts an error correction element into the response message so that the secure element 220 receiving the response message may determine whether the currently received data is reliable.

As described above, the secure element 220 receives information on the selected payment means from the control unit 210, grasps a main payment means on the basis of the received information, activates the selected application program, and perform a payment operation. In this process, the information exposed between the secure element 220 and the control unit 210 may be the type and version information of the application program installed in the secure element 220. Since other information is not exposed, the electronic card 20 according to the present disclosure may selectively activate and use various application programs stored in the secure element 220 while utilizing stability of the secure element 220.

According to embodiments, when a specific application program is activated in the secure element 220, information on the activated application program may be provided to the control unit 210. The control unit 210 may be implemented to display information related to the activated application program through the display unit 260 so that the user may confirm by which payment means the current payment is made.

According to embodiments, when the application means is not activated normally in the secure element 220, or when an operation may not be performed as a payment means set by the control unit 210 as an application means according to the payment means set by the control unit 210 is not stored in the secure element 220, or when an error occurs as the version information of the application program of the secure element 220 and the version information of the application program of the control unit 210 are different, the control unit 210 may display error information on the display unit 260.

When an application program linked to a payment means is activated in the secure element 220 according to the payment means activation information and a payment is normally made according thereto, the electronic card 20 may receive a payment approval result. The payment approval result may be received through the secure element 220 or the control unit 210, and the payment approval result may be displayed through the display unit 260.

Figure 3:
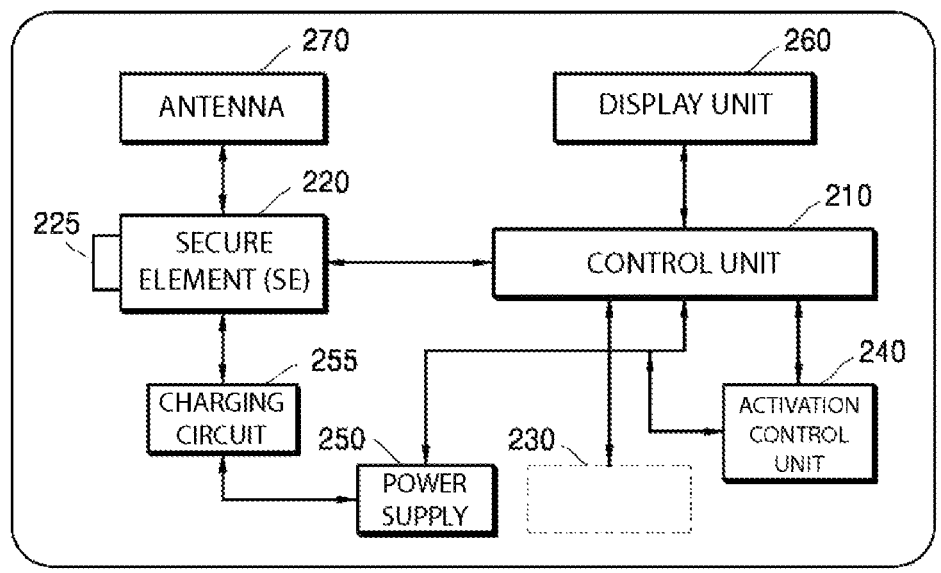

FIG. 3 is a block diagram showing an electronic card according to an embodiment of the present disclosure.

Compared with the electronic card 20 of FIG. 2, the electronic card 20' of FIG. 3 may further include a charging circuit 255 connecting the secure element 220 and the power supply 250'. Components the same as those of FIG. 2 are denoted by the same reference numerals, and since the same components have substantially the same configuration and perform substantially the same operation, detailed description thereof will be omitted.

In the case of the electronic card 20 of FIG. 2, when the power supply 250 formed inside the electronic card 20 is exhausted, the payment means of the control unit 210 may not be set without supply of power from the outside. However, the electronic card 20' of FIG. 3 includes a rechargeable power supply 250', is supplied with power through the contact unit 225 contacting with the outside, and may charge the power supply 250' through the charging circuit 255.

Accordingly, even when the battery of the electronic card 20' is fully discharged, the lifespan of the electronic card may be extended by recharging the power supply 250'.

Various embodiments of the selection unit provided in the electronic card will be described with reference to FIGS. 4 to 8. The selection unit 230 may be implemented in various forms from the aspect of appearance of the electronic card. Hereinafter, it will be described on the basis of the shape of the selection unit observed in appearance, and the internal function of the selection unit may be implemented in association with the external shape of the selection unit.

In addition, in FIGS. 4 to 8, the elements constituting the selection unit are referred to as selection elements. As described above, the selection elements may include mechanical or electrical selection means.

Figure 4:
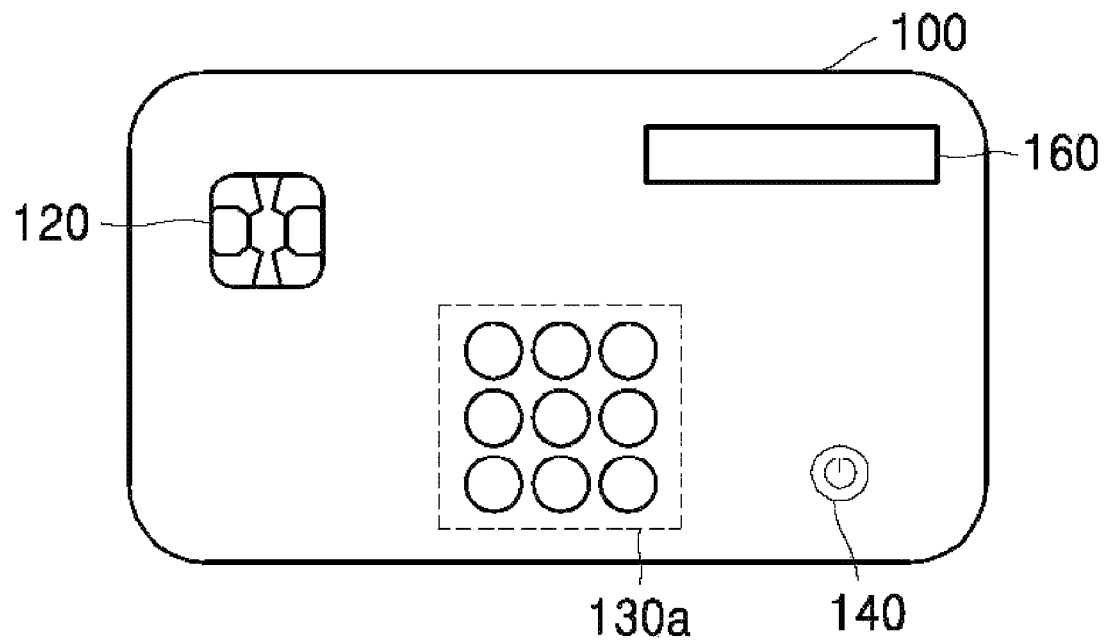
FIG. 4 is a view showing a case where a selection unit included in an electronic card according to the present disclosure is implemented as a plurality of selection elements in a form of recognizing a pattern.

Referring to FIG. 4, a plurality of selection elements may be arranged while configuring rows and columns. Although a plurality of selection elements is illustrated as being arranged in the form of a 3×3 matrix in FIG. 4 and FIGS. 5A to 5C and is described on the basis thereof, the present disclosure is not limited thereto and may be modified in various ways as needed. In addition, although the selection elements of the selection unit 130*a* may be implemented as physically separated objects, the selection elements may be divided by the boundaries (i.e., logical division) of the areas (e.g., coordinates) electrically separated in a single area.

When a user inputs a pattern by sequentially inputting a plurality of selection elements constituting the selection unit 130*a* included in the electronic card 10*a* of FIG. 4, the control unit 210 may recognize the input pattern and set a payment means mapped to the pattern.

Figure 5A:
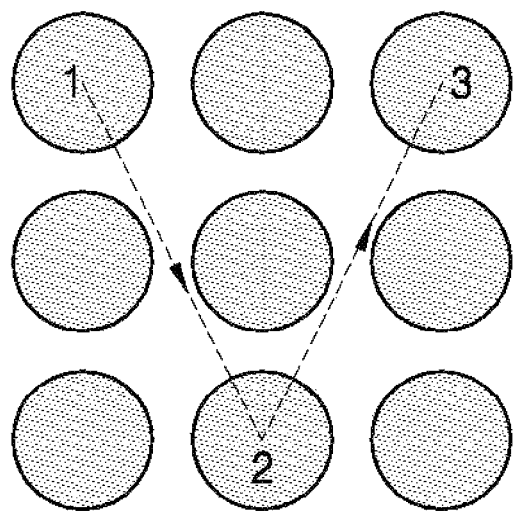
FIGS. 5A to 5C are views exemplarily showing a predefined pattern recognized through a selection unit provided in the electronic card of FIG. 4.
Figure 5B:
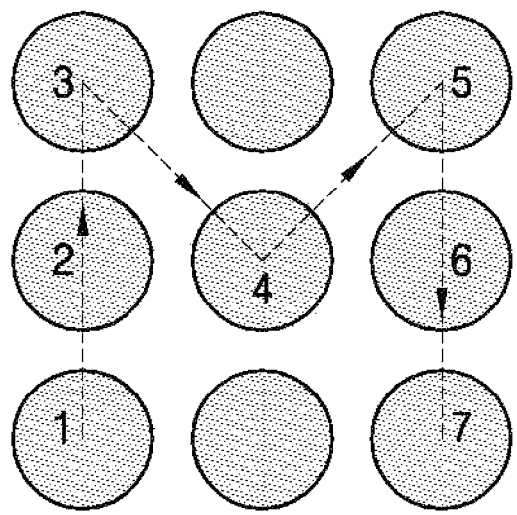
Figure 5C:
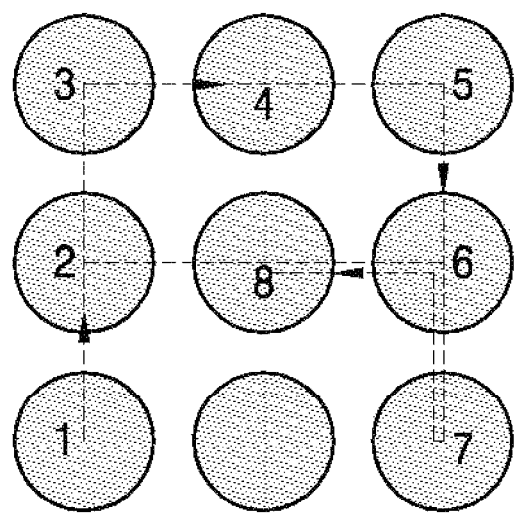

FIGS. 5A to 5C are views exemplarily showing a pattern inputted through a plurality of selection units provided in the electronic card of FIG. 4.

In FIGS. 5A to 5C, a plurality of card selection buttons 230 formed in the electronic card 20 or 20' includes nine buttons having a matrix form of 3×3. Hereinafter, for the convenience of explanation, rows and columns of the plurality of card selection buttons are displayed as (x, y) coordinates to indicate a specific card selection button. The upper left button is set to button (1, 1).

Referring to FIG. 5A, button (1, 1), button (2, 3), and button (3, 1) are sequentially inputted. When a time series combination of these buttons is indicated as a dotted line, it can be recognized as indicating alphabet 'V'. Accordingly, the user may recognize that 'V' is inputted on the plurality of card selection buttons 230 and input a pattern. The payment means linked to the corresponding pattern may be managed as "VISA" to be associated with the recognition of the user. A payment means linked to a predefined pattern may be managed in a storage means of the control unit 210 as described above. In addition, a predefined pattern and a payment means linked thereto or an application program linked to the payment means may be diversely changed.

Referring to FIG. 5B, buttons (1, 3), (1, 2), (1, 1), (2, 2), (3, 1), (3, 2) and (3, 3) are sequentially inputted and form a pattern of alphabet 'M'. Like this, when the control unit 210 recognizes a time series combination of the plurality of card selection buttons as a predefined pattern of 'M' and identifies a payment means corresponding thereto, it is determined that the corresponding payment means is internally set, and the payment means may be displayed through the display unit 260. For example, 'M' may be managed as a "Mastercard" payment means.

Referring to FIG. 5C, buttons (1, 3), (1, 2), (1, 1), (2, 1), (3, 1), (3, 2), (3, 3) and (2, 2) are sequentially inputted and form a pattern of alphabet 'A'. Similarly, the control unit 210 recognizes 'A' and consider it as corresponding to a predefined pattern and may generate payment means activation information according to an "AMEX" payment means corresponding to the pattern.

As described above, in the case of FIGS. 5B and 5C, the first three inputs of the plurality of card selection buttons are the same. In this case, it may be difficult to confirm what pattern is input internally. Therefore, it is implemented in the present disclosure to indicate that input of a pattern is completed by at least one button among the buttons included in the plurality of card selection buttons, and this is helpful for the control unit 210 to recognize a predefined pattern.

In another embodiment, the lengths of input patterns may be set to be the same. For example, the pattern is configured of three button inputs in FIG. 5A, the pattern is configured of seven button inputs in FIG. 5B, and the pattern is configured of eight button inputs in FIG. 5C. When the lengths of the patterns are different like this, the computing efficiency of the control unit 210 may be lowered, and thus the lengths of predefined patterns may be set to be equal. For example, the control unit 210 should continuously count a preset time and determine whether input of a plurality of selection elements forms a predefined pattern, and if the length varies in each pattern, the control unit 210 should wait until an input having the longest pattern length is received and determine whether a pattern is inputted. However, if there is a criterion defining that a predefined pattern is completed by four button inputs, the control unit 210 may immediately enter the sleep mode or may reset the pattern input if it is determined that a predefined pattern is not inputted through the four button inputs.

Although it is exemplarily described in FIG. 5A to FIG. 5C that a predefined pattern is formed in the shape of a first letter of an alphabet name referring to a payment means, it is not limited thereto, and the predefined pattern may be diversely formed by combination of a plurality of card selection buttons that can be recognized by the user and may be changed according to user's setting after the card is initially issued. The control unit 210 determines whether the inputted card selection buttons correspond to a predefined pattern, and when a predefined pattern is inputted, the control unit 210 may set the information on the corresponding payment means as the main payment card of the electronic card 20 or 20'. At the same time, the control unit 210 may display information on the set payment means through the display unit 260.

Table 5 exemplarily shows a relationship between predefined patterns and payment means managed by the control unit 210.

TABLE 5

| Index | Input pattern | Payment means | Selection | Display information |
|---|---|---|---|---|
| 1 | V | VISA |   | Visa |
| 2 | K | KONA-money | O | KONA-money |
| 3 | A | AMEX |   | AMEX |
| 4 | M | Mastercard |   | Mastercard |
| 5 | C | CUP |   | CUP |
| 6 | J | JCB |   | JCB |
| ... | ... | ... | ... | ... |

When an input pattern is inputted in association with information on an application program installed in the secure element 220, the control unit 210 may determine whether a specific payment means is selected. In addition, the information on the input pattern may include all information on the buttons inputted in time series.

According to embodiments, the control unit 210 may communicate with the secure element 220 to identify a type of an application program stored in the secure element 220, and to activate recognition of an input pattern mapped to a corresponding application program. For example, although the control unit 210 may store input pattern information for all application programs that can be installed in the secure element 220, the application programs installed in the secure element 220 may be different from this. Therefore, the control unit 210 recognizes only the patterns of the application programs installed in the secure element 220, and when a pattern of an application program not installed in the secure element 220 is inputted, the control unit 210 does not recognize the pattern or may determine the pattern as an incorrect input and provide feedback through the display unit 260.

The control unit 210 determines input of a predefined pattern and records that a corresponding payment means is selected. In addition, the control unit 210 may secure an internal storage space of the control unit 210 by deleting information of the patterns related to the application programs that are not installed in the secure element 220.

According to embodiments, the control unit 210 may store information on the currently selected payment means. When a payment means of KONA-money is selected as shown in Table 5, if the electronic card 20 or 20' in the sleep state is activated by the input of the activation control unit 240, information indicating that 'KONA-money' has been set may be displayed through the display unit 260.

When the user presses the activation control unit 240 to set the 'KONA-money' as a payment means, but the 'KONA-money' is already set as the payment means, the control unit 210 is switched to the sleep state by providing an input signal to the activation control unit 240 without an additional pattern input or the control unit 210 may be switched to the sleep state as nothing is inputted for a preset time.

According to embodiments, the control unit 210 may manage the information displayed on the display unit 260 when a predefined pattern is inputted. Although it is shown in Table 5 that the name of a payment means is displayed on the display unit 260, according to embodiments, any information may be used as long as the information can identify the type of a payment means. According to embodiments, since a plurality of cards may be issued for the same card brand and managed as payment means in the secure element 220, information combining a card brand name, a card number, a CVC number and the like may be displayed on the display unit 260.

According to embodiments, the information displayed on the display unit 260 may be edited outside the card and provided to the control unit 210 through the secure element 220.

When a request is received from the secure element 220, the control unit 210 may transmit a response message corresponding to payment means activation information on the basis of the information managed as shown in Table 5. For example, the control unit 210 may generate a response message as described above with reference to Table 4 and transmit the response message to the secure element 220.

Although a plurality of selection elements 130*a* may be used for setting a payment means through a time series combination, in another embodiment, each selection element may perform a different function according to an operation mode. For example, since an electronic card 10*a* performs a function of setting a payment means when the electronic card 10*a* does not communicate with an external terminal, i.e., when the electronic card 10*a* does not perform a payment function, selection elements may function to select a payment means, and when the electronic card 10*a* communicates with an external terminal, it may perform a function of displaying card information or an OTP.

Figure 6:
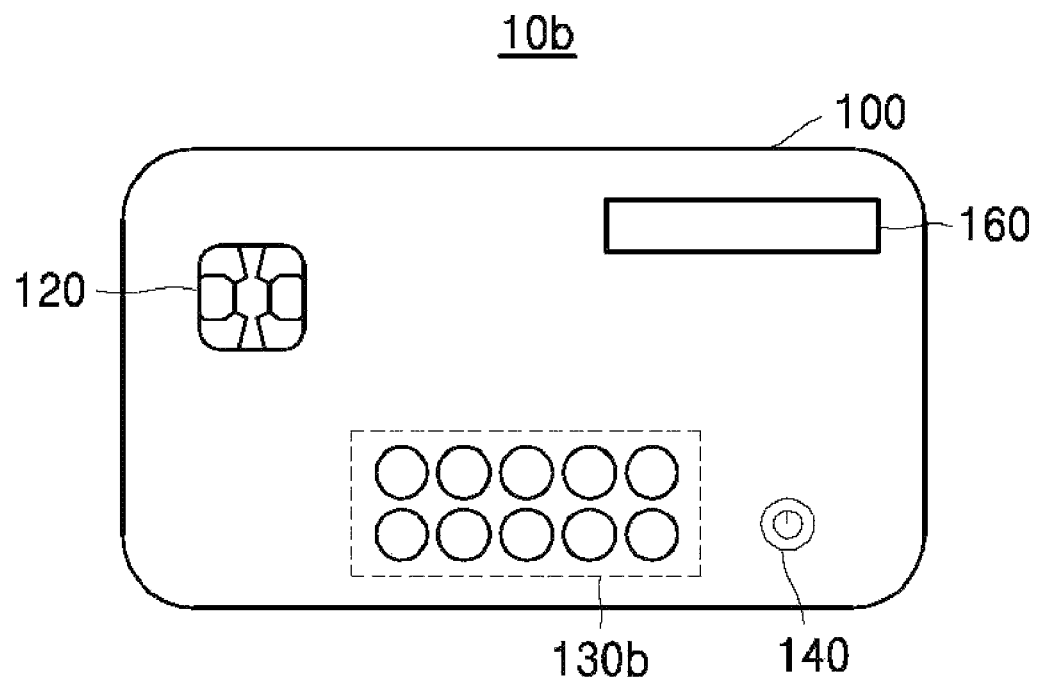
FIGS. 6 to 8 are views showing a selection unit of an electronic card according to various embodiments of the present disclosure.

FIG. 6 is a view showing a selection unit of an electronic card according to another embodiment of the present disclosure.

Referring to FIG. 6, the selection unit 130*b* may be configured of a plurality of selection elements, for example, it may include ten selection elements to input all of a one-digit decimal number. In this way, numbers from 0 to 9 may be inputted through the ten selection elements, or other values respectively corresponding to selection elements may be sequentially inputted. The number of selection elements shown in FIG. 6 is exemplary, and various numbers of selection elements may be included in the selection unit 130*b* according to embodiments.

According to embodiments, each payment means may be mapped to each of the selection elements of the selection unit 130*b*, and a payment means may be set by pressing a selection element of the selection unit 130*b* once. In another embodiment, ten or more payment means may be mapped, and the user may input a number to set a payment means mapped to the number. For example, when ten or more payment means are stored in the secure element 220, if the number of selection elements is limited, ten or more payment means may not be identified and inputted. Therefore, the user may input a signal for setting a fifteenth corresponding payment means by successively inputting a selection element indicating "1" and a selection element indicating "5" and waiting for a preset time, or in another embodiment, inputting a selection element corresponding to "Confirm".

Figure 7:
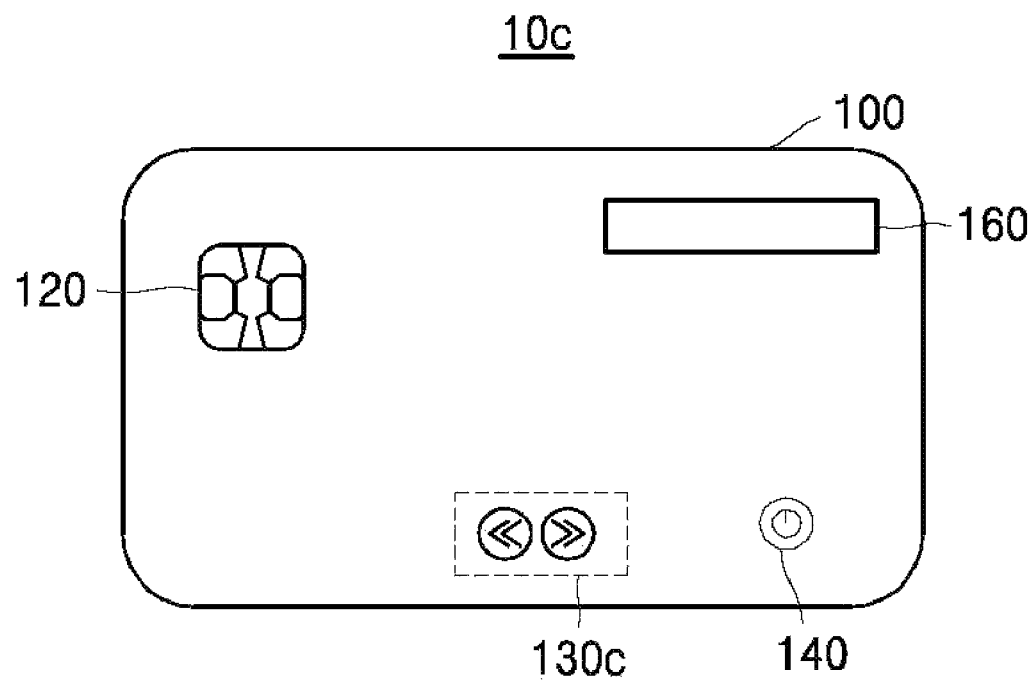

FIG. 7 is a view showing a selection unit of an electronic card according to another embodiment of the present disclosure.

Referring to FIG. 7, the selection unit 130*c* may include selection elements for selecting left and right. The selection elements for selecting left and right may complete selection by confirming an application program type displayed on the display unit 160, and maintaining a selection for a preset time or simultaneously pressing the left and right selection elements when a desired payment means is displayed on the display unit 260 after confirming an application program, i.e., a payment means, while selecting left and right.

Figure 8:
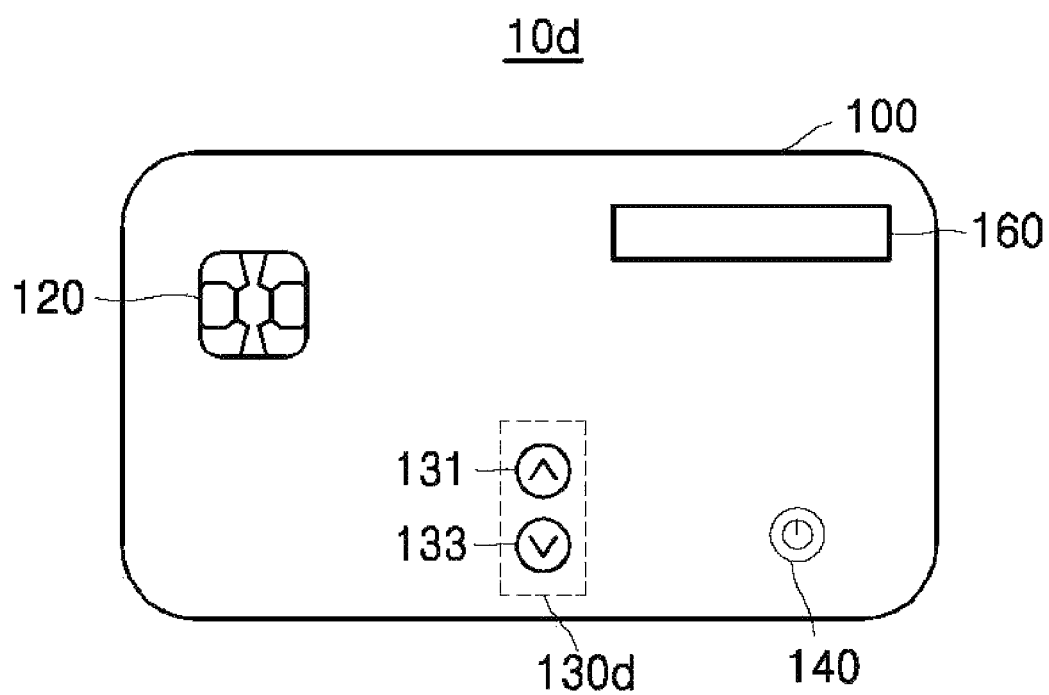

Referring to FIG. 8, the selection unit 130*d* may include selection elements for selecting up and down. Although the selection elements for selecting up and down may operate to confirm the payment means sequentially displayed on the display unit 160 in a manner similar to the selection unit 130*c* of FIG. 7, a slide input method may be adopted as another interface method.

For example, the left and right selection elements of the selection unit 130*c* of FIG. 7 follow a button input method of selecting once and releasing the selection, whereas the up and down selection elements of the selection unit 130*d* of FIG. 8 may operate according to a slide input method. That is, the up and down selection elements do not respond to pressure and may operate by recognizing to move upward when the up selection element 131 is selected after through the down selection element 133 and to move downward when the down selection element 133 is selected after through the up selection element 131. Accordingly, the up and down selection elements 131 and 133 may correspond to selection elements responding only to touch.

As described above, as the electronic card according to various embodiments of the present disclosure may include a selection unit that can be implemented as various selection elements in the card body of a plate shape, an application program linked to a payment means may be selected in various ways. Accordingly, user's convenience is enhanced, and the selection elements may be used for other purposes in the payment process.

Figure 9:
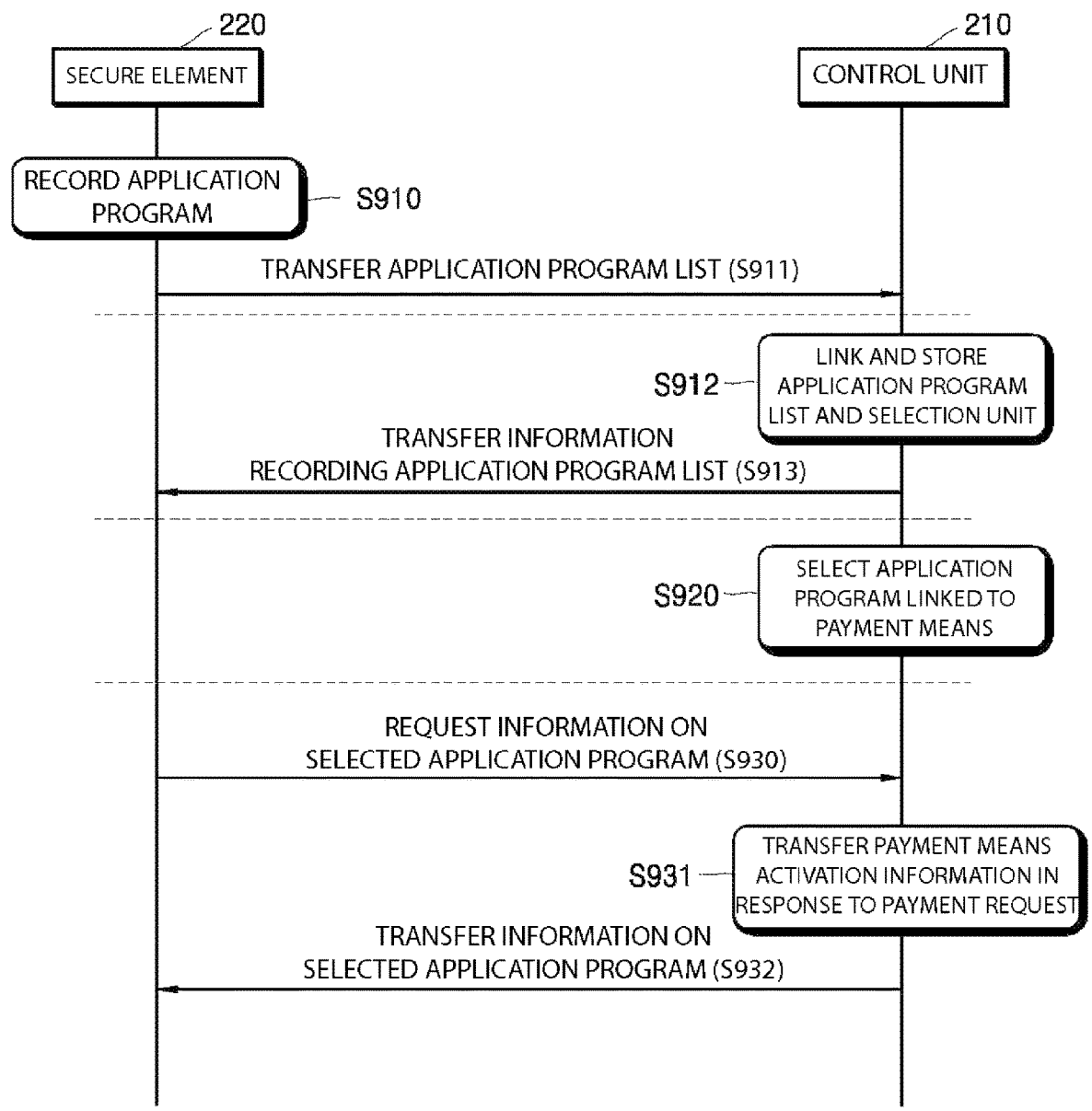
FIG. 9 is a flowchart illustrating an operating method of an electronic card according to an embodiment of the present disclosure.

FIG. 9 is a flowchart illustrating an operating method of an electronic card according to an embodiment of the present disclosure.

An electronic card according to the present disclosure includes an initialization step of sharing information on an application program recorded in the secure element 220 with the control unit 210 (step S910 to step S913), a step of receiving a selection signal through the selection unit 230, and selecting a program linked to a payment means (step S920), and a step of receiving information set as the payment means from the control unit 210 when a payment is made, by the secure element 220 (steps S930 to S932). Although these three main steps may be performed successively or independently and are described in the order described above in FIG. 9, the three steps are not limited to being performed in this order.

Referring to FIG. 9, an application program is recorded in the secure element 220 in the initialization step (step S910). The application program recorded in the secure element 220 may be transferred to the secure element 220 through an external card issuing terminal. The content of the application program recorded in the secure element 220 may be the same as the information described with reference to Table 1. The secure element 220 transfers an application program list to the control unit 210 (step S911).

The control unit 210 stores the application program list received from the secure element 220 in association with the selection unit. That is, when a signal is received from the selection unit 230, the control unit 210 may map and store which application program is selected from the received application program list.

The control unit 210 transfers a response indicating that the application program list has been received to the secure element 220 (step S930). The response message transmitted from the control unit 210 may have a data format the same as the data format described in Table 2. As the control unit 210 informs the secure element 220 of the version information of the confirmed application program list, when the version information of the application program list transmitted from the secure element 220 is different from the version information of the application program list of the control unit 210, the secure element 220 may transmit again the application program list.

According to embodiments, after storing the application program list, the control unit 210 may transmit a response about recording the application program list to the secure element 220, and store the application program list and the selection unit to be linked to each other.

Steps S910 to S913 may be progressed at the initial step of recording the application program in the secure element 220, i.e., at the step of issuing a credit card, and according to embodiments, the steps may be performed when the application program list of the control unit 210 is initialized, i.e., when the application program information recorded in the control unit 210 is lost as the power of the electronic card is completely exhausted regardless of issuance of the card and power supplied to the control unit 210 is cut off.

According to embodiments, which payment means is selected when certain selection unit 230 is inputted by the control unit 210, as well as recording an application program by the card issuer, may be delivered to the control unit 210 through an external device via the secure element 220. For example, the application program list information transferred from the secure element 220 to the control unit 210 may include index information of an application program, information displayed on the display unit when the application program is selected, and the like.

When a specific application program is selected through a predefined pattern as described above with reference to FIG. 4 and FIGS. 5A to 5C, the input pattern may be determined by the card company when the card is issued and stored in the secure element 220 together with the application program. However, the user may edit the predefined pattern for convenience and provide it to the control unit 210 through the secure element 220.

In addition, the user may edit the payment means mainly used by the user, among the plurality of application programs stored in the secure element 220, to be mapped to selection elements which are convenient to input according to the priority. For example, when an application program linked to a payment means is mapped to each of the selection elements included in the selection unit 230, the user may edit and provide an application program mapped to the selection unit 230 to the secure element 220 so that the payment means mainly used by the user may be mapped to the first and second selection elements, and as the secure element 220 transfers the edited application program list to the control unit 210, the application program mapped to the selection unit 230 may be changed.

Such an edit may be made through an index edit of Table 7 in Table 6 shown below. In Table 6, indexes are configured in the order of VISA, KONA-money, AMEX, Mastercard, CUP, and JCB, and may be mapped to the selection unit according to the index order.

TABLE 6

| Index | Payment means (Application program) |
|---|---|
| 1 | VISA |
| 2 | KONA-money |
| 3 | AMEX |
| 4 | Mastercard |
| 5 | CUP |
| 6 | JCB |
| . . . | . . . |

However, the secure element 220 may change the index information as shown in Table 7 and transfer the index information to the control unit 210 as an application program list. In this case, since the control unit 210 may map the payment means to the selection elements of the selection unit 230 in order of the index of KONA-money, JCB, Mastercard, AMEX, CUP, and VISA, even when the same selection element of the selection unit 230 is inputted, the KONA-money is selected in Table 7 if the VISA is selected before, and if the KONA-money is selected before the index is changed, the JCB may be selected after the change.

TABLE 7

| Index | Payment means (Application program) |
|---|---|
| 1 | KONA-money |
| 2 | JCB |
| 3 | Mastercard |
| 4 | AMEX |
| 5 | CUP |
| 6 | VISA |
| . . . | . . . |

In addition, in another embodiment, when a corresponding application is selected, or in order to confirm whether a selection is currently progressed for a certain payment means through the display unit 260, such as the left and right selection elements (see FIG. 7) or the up and down selection elements (see FIG. 8), information on the application program list may include payment means indication information.

TABLE 8

| Index | Payment means | Display information |
|---|---|---|
| 1 | VISA | V-1234 |
| 2 | KONA-money | KONA-money |
| 3 | AMEX | A-901 |
| 4 | Mastercard | Mastercard |
| 5 | CUP | CUP |
| 6 | JCB | JCB |
| ... | ... | ... |

According to embodiments, the display information may be edited, and the edited display information may be transferred to the control unit 210 through the secure element 220. For example, as shown in Table 8, the display information for identifying a payment means may be configured of a name of the payment means, an alphabet letter representing the payment means, a four-digit card number, a CVC number and the like. As described above, the display information like this is exemplary and may be diversely changed as needed.

According to embodiments, the steps S910 to S913 described above may be repeatedly performed whenever the application program list information stored in the secure element 220 is updated.

The application program list is transferred to the control unit 210, and accordingly, a main payment means may be selected through the selection unit 230 (step S920). Selection of an application program linked to a payment means will be described in detail with reference to FIGS. 10 and 11.

When a payment means is selected through the selection unit 230, the control unit 210 generates and internally manages payment means activation information, and transfers the payment means activation information (step S931) in response to the request information on the selected application program received from the secure element 220 (step S930). The request signal transferred from the secure element 220 to the control unit 210 when a payment is requested may correspond to the command message described with reference to Table 3, and the control unit 210 may transfer the selected application program information in response thereto (step S932). The response transferred from the control unit 210 to the secure element 220 may have a data format the same as that of the response message described with reference to Table 4.

According to embodiments, when the user does not select an application program linked to a payment means, i.e., while step S920 is not performed, the secure element 220 may request information on the selected application program from the control unit 210. In this case, the control unit 210 may transfer information indicating that there is no selected value or information indicating that the payment means assigned to the highest priority index described with reference to FIGS. 6 to 8 is selected.

As described above with reference to FIG. 9, the electronic card according to the present disclosure may transfer information on an application program by performing communication, which requires security, between the secure element 220 and the control unit 210, and control so that the application program selected by the user may be activated. In addition, as various information related to the application program is transmitted and received, the method of selecting an application program may be diversely modified according to user's convenience, and the method of displaying the information on the display unit may also be changed.

Accordingly, there is an advantage in that the user's convenience for the electronic card is enhanced.

Figure 10:
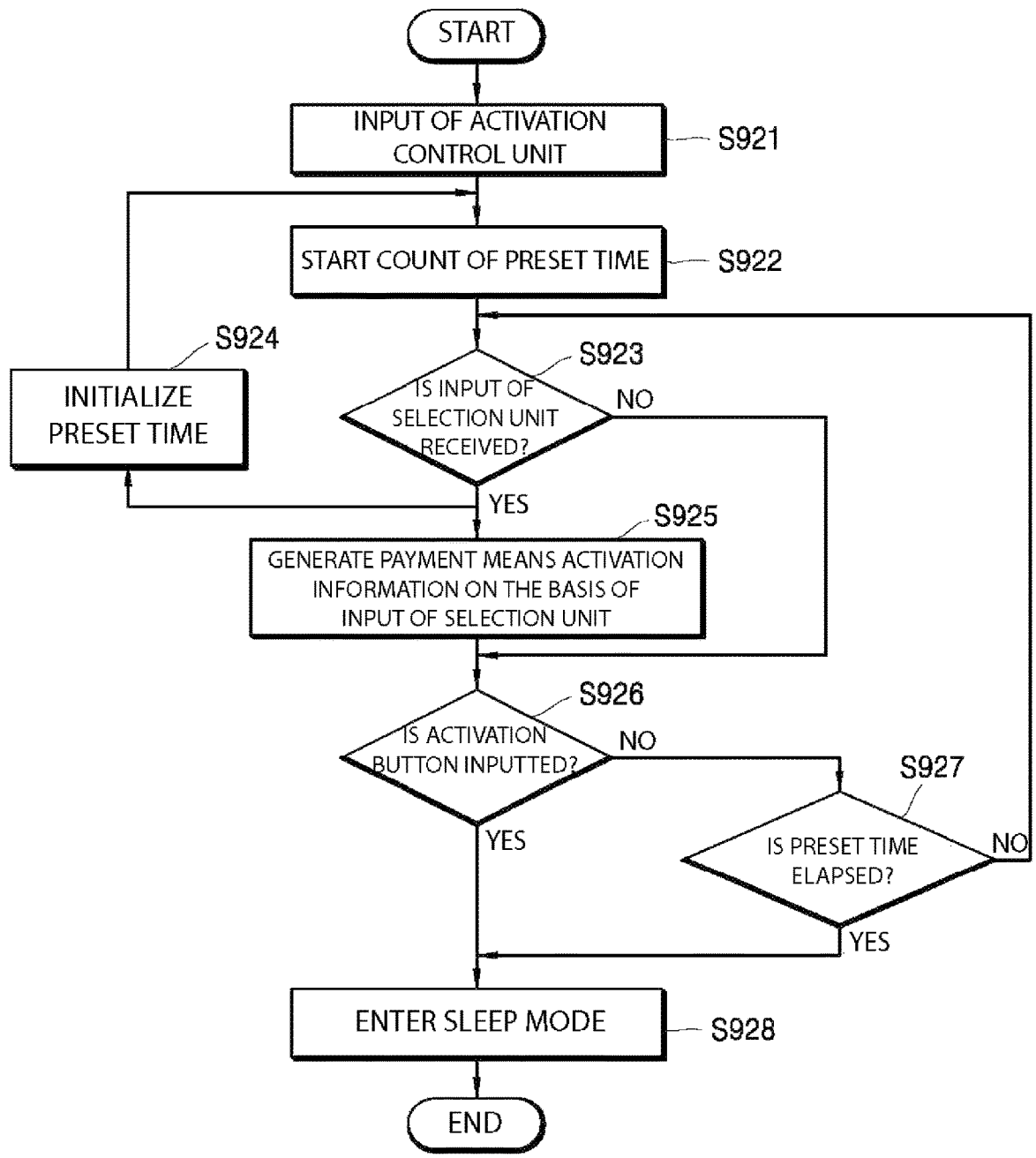
FIGS. 10 and 11 are flowcharts illustrating an operating method of an electronic card according to an embodiment of the present disclosure.
Figure 11:
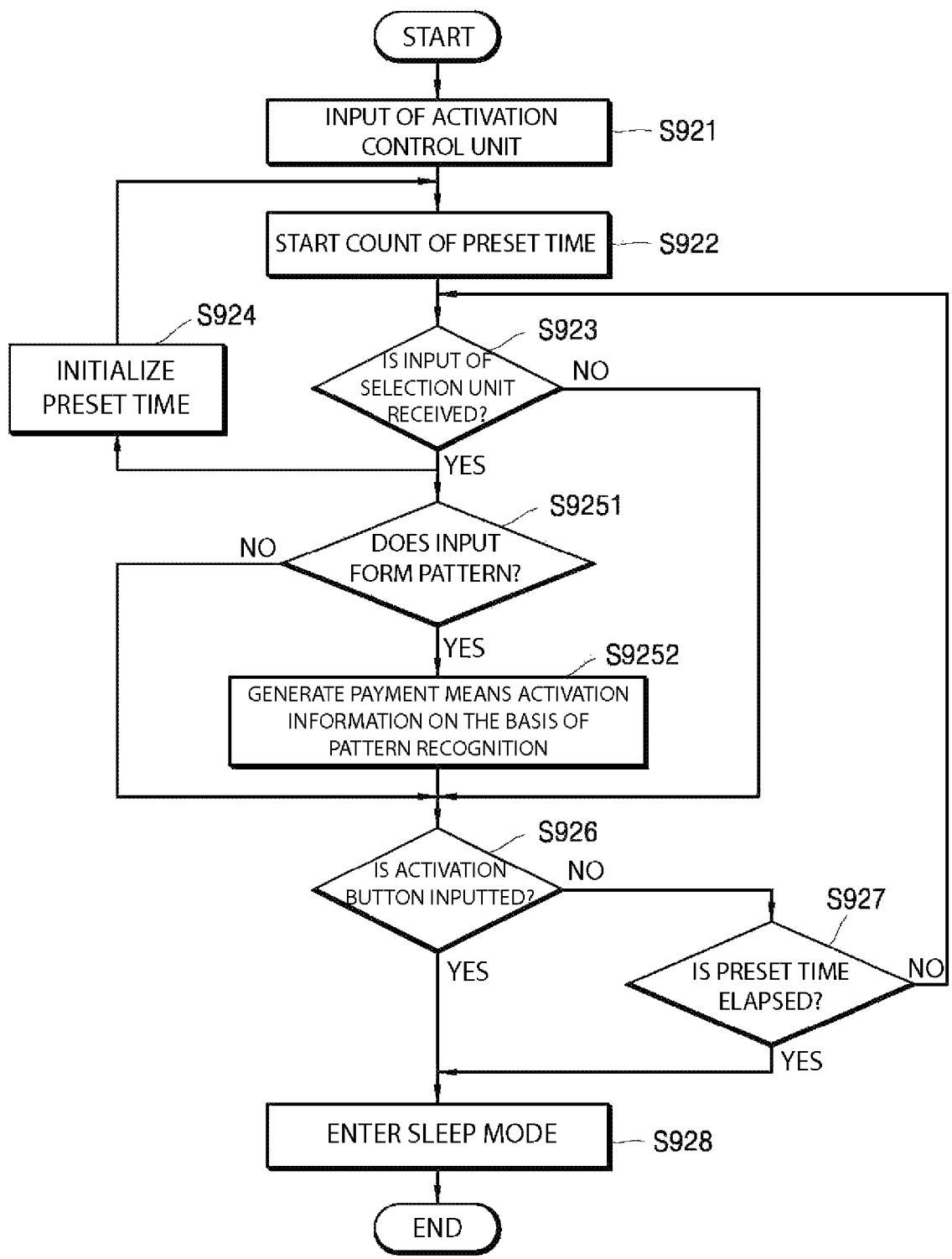

FIGS. 10 and 11 are flowcharts specifically illustrating an operating method of an electronic card, particularly, a method of selecting an application program linked to a payment means, according to embodiments of the present disclosure.

Referring to FIG. 10, an input signal for the activation control unit 240 formed in an electronic card of a plate shape is received (step S921). As the activation control unit 240 receives the input, power may be supplied from the power supply 250 or 250' to the control unit 210.

The control unit 210 is switched from the sleep state to the activated state in response to the input of the activation control unit 240, and starts counting a preset time (step S922). As the control unit 210 is switched to the activated state, the control unit 210 may display information for identifying the currently set payment means through the display unit 260. According to embodiments, the display unit 260 may be supplied with power required for operation from the power supply 250 or 250'.

The control unit 210 waits for an input from the selection unit 230 while counting the preset time. For example, the control unit 210 may recognize that at least one of the plurality of selection elements constituting the selection unit 230 is inputted. When an input is received from the selection unit within a preset time (step S923, YES), the control unit 210 generates payment means activation information on the basis of the input of the selection unit 230 (step S925). Since the selection unit 230 may be implemented in various ways as described above, the control unit 210 may identify the input of the selection unit 230 in various ways. According to exemplary embodiments, the control unit 210 may display the payment means information through the display unit 260 in real time in response to the input of the selection unit.

When an input is received from the selection unit 230 within a preset time, the control unit 210 initializes the preset time (step S924) and starts counting the preset time again. In addition, when a new input of the selection unit is received, the control unit 210 may ignore the previous selection and identifies the input as a new selection, or if the input of the selection unit is sequentially identified, the input of the selection unit may be sequentially received and identified.

According to embodiments, the payment means activation information formed by the control unit 210 may be provided when the secure element 220 is activated and utilized for activating a specific application program in the secure element 220, and furthermore, it may be utilized for displaying information which identifies an activated payment means.

If no input is received from the selection unit 230 (step S923, NO), and the activation control unit 240 receives an input (step S926, YES), the control unit 210 enters the sleep mode (step S928). For example, when the user attempts to set a payment means through the activation control unit 240 and the currently set payment means is the payment means that the user desires as a result of confirming through the display unit 260, the user does not perform separate payment means setting and makes an input again into the activation control unit 240 so that the control unit may enter the sleep mode.

If an activation button is not inputted (step S926, NO), the control unit 210 determines whether the preset time is elapsed (step S927). When the preset time is elapsed (step S927, YES), the control unit 210 enters the sleep mode (step S928), and when the preset time is not elapsed (step S927, NO), the control unit 210 waits for an input of the selection unit 230.

FIG. 11 is a flowchart illustrating an operating method of an electronic card when the selection unit receives a selection associated according to a time series sequence.

Compared with the operating method of the electronic card described with reference to FIG. 10, all the steps of the operating method of the electronic card shown in FIG. 11 are the same, except the steps of determining whether the input forms a preset pattern according to input of the selection unit, and generating payment means activation information according to recognition of the pattern.

When an input is received from the selection unit 230 (step S923, YES), the control unit 210 determines whether the input of the selection elements forms a predefined pattern (step S9251).

The control unit 210 may sequentially determine the input of the selection elements and determine in real time whether the input matches input patterns managed inside thereof.

When input of the selection elements does not form a pattern (step S9251, NO) and the activation control unit 240 receives an input again (step S926, YES), the control unit 210 enters the sleep mode (step S926). According to embodiments, when input of the selection unit 230 does not form a pattern (step S9251, NO), the control unit 210 may display a pattern input error or a payment means setting error message through the display unit 260.

If input of the selection unit does not form a pattern (step S9251, NO), and the activation control unit 240 dos not receive an input (step S926, NO), the control unit 210 determines whether the preset time being counted is elapsed. If the preset time is not elapsed (step S927, NO), the control unit 210 waits for an input of the selection unit 230 until the preset time elapses. If the preset time is elapsed (step S927, YES), the control unit 210 may enter the sleep mode (S928).

The operating method described above is an operating method of an electronic card performs setting to activate one of a plurality of application programs that can be installed in the secure element 220 of the electronic card 20 or 20'. A payment means set in the method described above may be transferred as payment means activation information according to activation of the secure element 220 and operate to activate an application program linked to the set payment means.

As described above, as it is inputted to set a plurality of card selection buttons formed in an electronic card 20 or 20' of a plate shape as a specific payment means through a time series combination of button inputs, the electronic card 20 or 20' may function as various payment means.

Until now, the present disclosure has been described in detail focusing on the preferred embodiments shown in the drawings. These embodiments are not intended to limit the present disclosure, but only illustrative, and should be considered from the descriptive viewpoint, not the restrictive viewpoint. The true scope of the present disclosure should be defined by the spirit of the attached claims, not by the above descriptions. Although specific terms are used in this specification, they are used only to describe the concept of the present disclosure, not to limit the meaning or restrict the scope of the present disclosure disclosed in the claims. Each step of the present disclosure does not need to be necessarily performed in the disclosed order and may be performed in parallel, selectively or individually. Therefore, those skilled in the art may understand that various modified forms and equivalent other embodiments are possible without departing from the intrinsic spirit of the present disclosure claimed in the claims. It should be understood that the equivalents include all components invented to perform the same functions regardless of the equivalents, i.e., structures, to be developed in the future, as well as the currently disclosed equivalents.

The invention claimed is:

1. An electronic card comprising:
 a card plate having a plate shape;
 a secure element embedded in the card plate having the plate shape to store a plurality of application programs linked to a payment means;
 a control unit for identifying one of the plurality of application programs on the basis of a selection signal received through a selection unit formed on the card plate, and generating payment means activation information;
 a display unit for displaying information for identifying the payment means on the basis of the payment means activation information; and
 a power supply formed on the card plate and activated regardless of a card payment to supply power to the control unit and the selection unit and drive transmission and reception of the selection signal,
 wherein as the payment means is stored to be mapped to the selection signal on the basis of information on the plurality of application programs provided by the secure element, the control unit manages the application program identified on the basis of the selection signal as a selected application program and generates the payment means activation information,
 wherein when a payment attempt is made from an outside, the secure element receives the payment means activation information from the control unit and activates the selected application program
 wherein the secure element requests the payment means activation information from the control unit in response to a payment request received from the outside, and
 wherein as the information on the plurality of application programs is changed, the secure element transfers the changed application program information to the control unit.

2. The electronic card according to claim 1, wherein the information on the plurality of application programs provided from the secure element to the control unit includes at least one among an index of each application program, information displayed on the display unit to identify each application program, and description of a payment means linked to each application program.

3. The electronic card according to claim 1, wherein as supply of power from the power supply begins, the control unit displays information for identifying the payment means set on the basis of the payment means activation information on the display unit.

4. The electronic card according to claim 1, wherein the control unit displays information for identifying the payment means linked to the plurality of application programs on the display unit in response to the selection signal received from the selection unit.

5. The electronic card according to claim 4, wherein the selection unit includes at least one among up, down, left and right selection elements for sequentially selecting the plurality of application programs.

6. The electronic card according to claim 1, wherein when an input of the selection unit is not received within a preset time starting from a time point of starting supply of power from the power supply, the control unit enters a sleep mode.

7. The electronic card according to claim 6, further comprising an activation control unit formed on the card plate to control activation of supply of power.

8. The electronic card according to claim 7, wherein when an input of the activation control unit is received within the preset time staring starting from the time point of starting supply of power, the control unit enters the sleep mode.

9. The electronic card according to claim 2, wherein the control unit maps the index information and the selection signal among the application program information.

10. An electronic card operating method using an electronic card including a secure element installed in a card plate having a plate shape, the method comprising the steps of:
transmitting information on a plurality of installed application programs to a control unit, by the secure element;
requesting information on an application program selected among the plurality of application programs from the control unit in response to a payment request received from an outside, by the secure element;
activating a corresponding application program on the basis of information on the selected application program, by the secure element;
mapping and managing information on the plurality of application programs received from the secure element and a selection signal received through a selection unit formed on the card plate, by the control unit;
receiving a response according to transmission of information on the plurality of application programs from the control unit, by the secure element; and
retransmitting information on the plurality of application programs on the basis of application program version information included in the response received from the control unit, by the secure element.

11. The method according to claim 10, further comprising the step of identifying the selected application program from the plurality of application programs on the basis of the selection signal, and generating payment means activation information, by the control unit.

12. The method according to claim 10, further comprising the steps of:
supplying power to the control unit and the selection unit from a power supply formed on the card plate in response to an input of an activation control unit formed on the card plate;
starting count of a preset time in response to the input of the activation control unit, by the control unit; and
entering a sleep mode when an input of the selection unit is not received within the preset time or the input of the activation control unit is received, by the control unit.

13. The method according to claim 12, further comprising the step of initializing count of the preset time when the input of the selection unit is received within the preset time, by the control unit.

14. The method according to claim 10, further comprising the step of displaying information for identifying a payment means linked to the selected application program through a display unit formed on the card plate, by the control unit.

* * * * *